US007349386B1

(12) United States Patent
Gou

(10) Patent No.: US 7,349,386 B1
(45) Date of Patent: Mar. 25, 2008

(54) METHOD AND APPARATUS FOR TRANSPORTING MPEG STREAMS ON IP NETWORKS INCLUDING REMOVING NULL PACKETS

(75) Inventor: Dayin Gou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1079 days.

(21) Appl. No.: 10/369,033

(22) Filed: Feb. 18, 2003

(51) Int. Cl.
*H04L 12/66* (2006.01)
(52) U.S. Cl. .................. 370/356; 370/401; 370/466
(58) Field of Classification Search ............. 370/401, 370/356, 466, 467, 394, 521
See application file for complete search history.

(56) References Cited

U.S. PATENT DOCUMENTS

| 5,862,450 | A | | 1/1999 | Mandal et al. ............. 455/3.1 |
| 5,991,912 | A | * | 11/1999 | Mao ............................ 714/776 |
| 6,175,573 | B1 | * | 1/2001 | Togo et al. .................. 370/474 |
| 6,181,711 | B1 | | 1/2001 | Zhang et al. ............... 370/468 |
| 6,185,736 | B1 | | 2/2001 | Ueno .......................... 725/95 |
| 6,434,141 | B1 | | 8/2002 | Oz et al. ..................... 370/352 |
| 6,483,543 | B1 | | 11/2002 | Zhang et al. ............... 348/390 |
| 6,493,832 | B1 | | 12/2002 | Itakura et al. ............... 713/600 |
| 6,512,419 | B1 | | 1/2003 | Adams et al. ............... 331/17 |
| 2002/0024970 | A1 | | 2/2002 | Amaral et al. ............. 370/468 |
| 2003/0002577 | A1 | | 1/2003 | Pinder ..................... 375/240.01 |
| 2004/0114817 | A1 | * | 6/2004 | Jayant et al. .............. 382/239 |
| 2004/0244058 | A1 | * | 12/2004 | Carlucci et al. ............ 725/135 |
| 2005/0060759 | A1 | * | 3/2005 | Rowe et al. ............... 725/143 |

OTHER PUBLICATIONS

John T. Chapman, "Multimedia Traffic Engineering for HFC Networks," Cisco Systems, Inc., San Jose, CA, (Nov. 29, 1999).

(Continued)

*Primary Examiner*—Min Jung
(74) *Attorney, Agent, or Firm*—Dov Rosenfeld; Inventek

(57) ABSTRACT

An encapsulation method and an apparatus for encapsulating compressed media packet into IP packets. The encapsulating method includes accepting a compressed media data stream that may include null packets. The method further includes identifying any null packets in the accepted stream and the null packets' relative position in the stream, encapsulating the non-null compressed media data packets into a set of IP packets; and adding information to each IP packet sufficient to reconstruct a reconstructed compressed media data stream from the set of IP packets. The reconstructed stream may include null packets that were not present in the set of IP packets. The encapsulating includes discarding at least some of the null packets in the case that the compressed media data stream contains null packets. Also a method and apparatus for determining the timing of packets of compressed media data that are encapsulated by an encapsulation method that includes discarding null packets and including information about such discarding. The timing determining method includes accepting an IP packet encapsulating a subset of compressed media data packets of a compressed media data stream, and ascertaining if the IP packet includes information indicating whether or not null packets have been removed from the compressed media data stream. If such indicating information is included, the method includes determining from the included indicating information the timing of the encapsulated subset of packets and of any null packets that were removed from the section of the compressed media data stream that includes the encapsulated subset of packets.

50 Claims, 6 Drawing Sheets

OTHER PUBLICATIONS

"Broadcast Quality Video over IP/Ethernet-Architecture for Today", Harmonic Inc., Cisco Systems, Inc., San Jose, CA, Sep. 2002.

R. Noro and J.P. Hubaux, "Clock Synchronization of MPEG-2 Services over Packet Networks", Technical Report SSC/1998/015, EPFL-SSC, Laboratory computer Communications and Applications, Swiss Federal Institute of Technology—Lausanne (EPFL), Switzerland, 1998.

T. Takahashi, H. Kasai, T. Hanamura, M. Sugiura, and H. Tominaga, "MPEG-2 Multi-Program Transport Stream Transcoder", Waseda University, Tokyo, Japan. Also available at http://www.tom.comm.waseda.ac.jp/~take/web/icme2001.pdf.

A. Basso, S. Varakliotis, and R. Castagno, "Transport of MPEG-4 over IP/RTP", AT&T Labs- Research, Red Bank, USA—University College London, UK—Nokia Mobile Phones, Tampere, Finland. Internet draft available at www.diee.unica.it/pv2000/proceedings/papers/52.pdf.

"IP Gateway: DVB-RCS compliant Satellite Internet Access System", V 1.1 Product Brief, Alcatel Bell Space N.V., Belgium, Feb. 2002.

"Opal IP Gateway", Thales Broadcast & Multimedia, Inc., Southwick, Massachussetts. Also available at www.thales-bm.com.

C. Tryfonas, MPEG-2 Transport over ATM Networks, Master's thesis, University of California at Santa Cruz, Sep. 1996.

C. Tryfonas & A. Varma, "MPEG-2 Transport over ATM Networks", *IEEE communications Surveys*, Fourth Quarter 1999, vol. 2, No. 4. Available at http://www.comsoc.org/pubs/surveys.

* cited by examiner

METHOD AND APPARATUS FOR TRANSPORTING MPEG STREAMS ON IP NETWORKS INCLUDING REMOVING NULL PACKETS

BACKGROUND

The present invention is related to multimedia networks, and in particular to transporting a compressed media data stream, e.g., an MPEG video stream that includes null packets on a packet network by removing the null packets while maintaining the timing information.

Video on Demand (VoD) and cable operators typically store and send compressed media streams such as MPEG2 and MPEG4 streams to an endpoint such as a subscriber as constant bit rate (CBR) streams. Hybrid fiber-coax networks (HFC networks) are commonly used for transporting the compressed media streams and typically work best when the media stream is a substantially constant bit rate (CBR) stream at a bit rate that matches the available bandwidth of the HFC link. In that manner, any buffer at an endpoint is then not likely to overflow and/or underflow.

HFC networks combine both optical-fiber and coaxial cable lines. As an example, an optical fiber runs from a cable head end to feeders that feed neighborhoods of 500 to 2,000 subscribers, and then a coaxial cable runs from the optical-fiber feeder to each subscriber. The subscriber typically includes a set top box that decodes and plays back the media stream. Hybrid networks provide many of fiber's reliability and bandwidth benefits at a lower cost than a pure fiber network.

Many media streams, e.g., the streams of a typical video program received via satellite or the stream of a video program stored in a DVD intrinsically have a variable bit rate (VBR). Such a VBR stream is converted to a CBR stream, for example for storage in VoD servers or cable head ends for sending to subscribers. One common method for this conversion is to insert additional packets that do not carry significant information—called null packets herein—at appropriate locations in the stream to make the streams substantially CBR for the available bandwidth. The insertion is carried out in a manner that retains the timing information of the non-null packets, e.g., the video, audio, PSI, etc., packets in the case of MPEG2 streams. When an endpoint such as a set top box decodes and plays back the media stream, the null packet are essentially discarded.

Thus, it is known to convert a VBR media stream of a program to a substantially CBR stream by inserting null packets.

There recently has been a move to transport compressed media streams on IP networks. Such media streams are transported using UDP or RTP over UDP. The IETF RFC 2250 titled "RTP Payload Format for MPEG1/MPEG2 Video," for example, describes a packetization scheme to transport MPEG video using RTP over UDP, i.e., using IP/UDP/RTP packets. The IETF is presently drafting similar schemes for transporting MPEG4 streams. Other methods of encapsulating compressed media streams may also be or become known, although RTP is assumed herein.

When MPEG is transported over IP, there typically is an MPEG to IP gateway on the sending side to encapsulate the MPEG stream and an IP to MPEG gateway on the receiving side to carry out such processing as jitter removal. Often, the IP to MPEG gateway also multiplexes the packets of several MPEG streams of single programs into an MPEG stream of multiple programs.

In the case that the MPEG stream of a single program is a CBR stream, the IP to MPEG gateway also rebuilds the individual CBR MPEG streams prior to multiplexing. The timing of the information-carrying media packets needs to be retained or recovered. Null packets can be locally added as needed.

When an MPEG stream that has been made substantially CBR by adding null packets is to be transported over IP, a typical prior art MPEG to IP gateway encapsulates the CBR MPEG streams, including the null packets used for padding, into IP/UDP/RTP packets and send them on via the IP network. This method is wasteful of bandwidth because the null packets contain bits that do not contain much useful information; their purpose is to make the encapsulated MPEG streams substantially CBR and to retain the timing for the media packets.

There thus is a need for a method and apparatus to encapsulate an MPEG stream that may include null packets to IP packets without encapsulating all the null packets. The method should provide for reconstructing the substantially CBR stream from the IP packets. There further is a need for a method and apparatus that sends the IP packets containing the encapsulated MPEG stream. There further is a need for a method and an apparatus that receives the IP packets encapsulating the MPEG stream packets and reconstructing the timing of the encapsulated MPEG packets, e.g., to reconstruct an essentially CBR MPEG stream. The stream reconstructing may include adding null packets as necessary, while maintaining the timing information of the packets.

Removing the null packets at the MPEG to IP gateway before sending the streams on the IP networks provides savings on bandwidth.

SUMMARY

Described herein are an encapsulation method and an apparatus for encapsulating. The encapsulating method includes accepting a compressed media data stream that may include null packets. The method further includes identifying any null packets in the accepted stream and the null packets' relative position in the stream, encapsulating the non-null compressed media data packets into a set of IP packets; and adding information to each IP packet sufficient to reconstruct a reconstructed compressed media data stream from the set of IP packets. The reconstructed stream may include null packets that were not present in the set of IP packets. The encapsulating includes discarding at least some of the null packets in the case that the compressed media data stream contains null packets. Also a method and apparatus for determining the timing of packets of compressed media data that are encapsulated by an encapsulating method that includes discarding null packets and providing information about such discarding. The timing determining method includes accepting an IP packet encapsulating a subset of compressed media data packets of a compressed media data stream, and ascertaining if the IP packet includes information indicating whether or not null packets have been removed from the compressed media data stream. If such indicating information is included, the method includes determining from the included indicating information the timing of the encapsulated subset of packets and of any null packets that were removed from the section of the compressed media data stream that includes the encapsulated subset of packets.

DETAILED DESCRIPTION

Described herein is a method of encapsulating packets of a compressed media data stream such as an MPEG stream inside an IP packet. The method includes removing null packets that may be in the stream and encapsulating information in each IP packet related to the removed null packets. The encapsulated information is such that a reconstructed compressed media data stream can be reconstructed from the set of IP packets that encapsulate all the non-null packets of the stream. The reconstructed stream may include null packets that were not present in the set of IP packets. The method is typically implemented in an MPEG to IP gateway. An apparatus implementing the encapsulating method is also described.

Also described herein is a method to recover the timing of the packets of compressed media data, e.g., of MPEG packets from IP packets that encapsulate the non-null packets. The timing recovery method can be carried out on the IP to MPEG gateway and make processing like re-multiplexing possible. An apparatus implementing the timing recovery method is also described.

Figure 1:
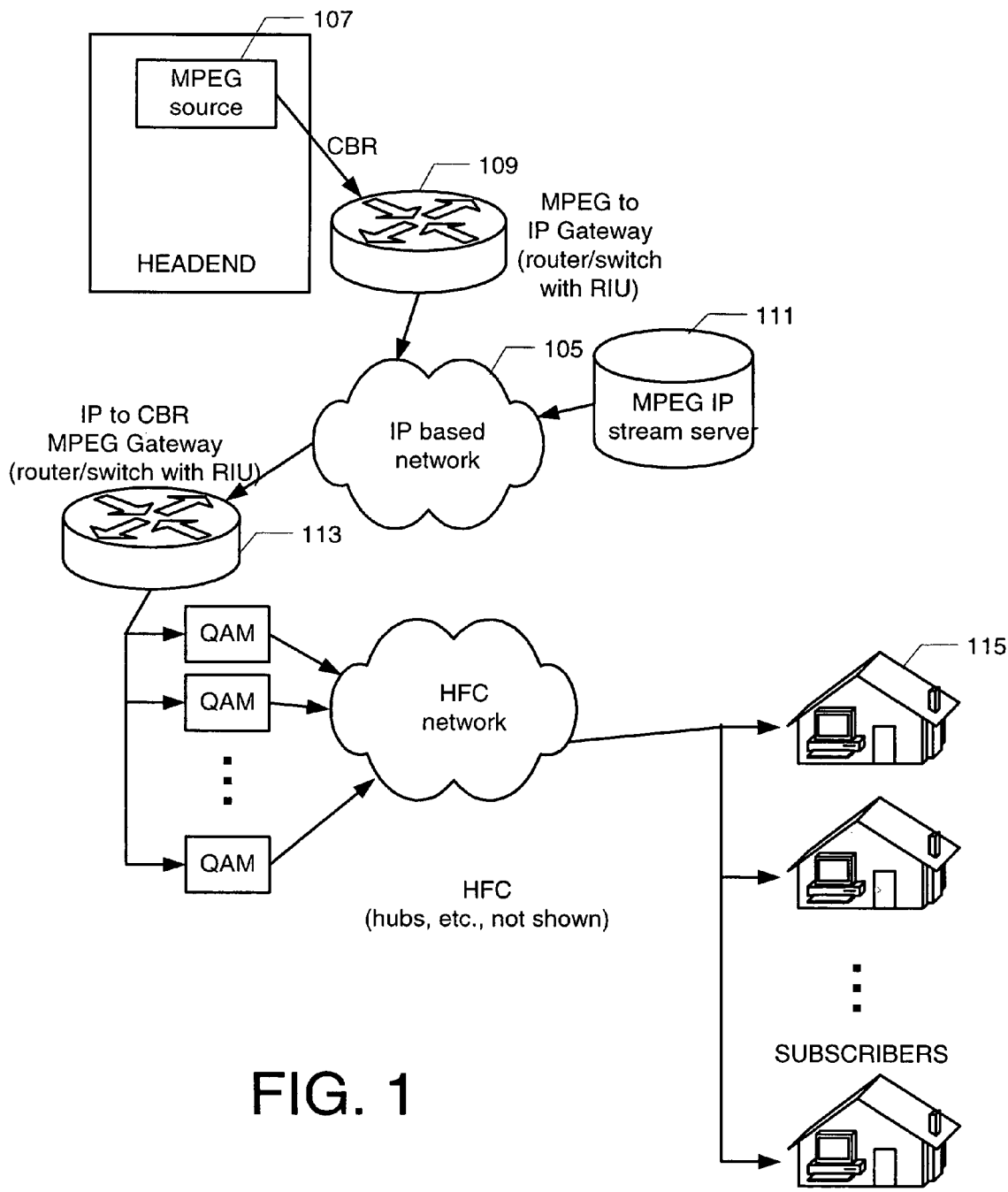
FIG. 1 shows in simplified form a typical video on demand (VoD) configuration in which embodiments of the present invention may be used.

FIG. 1 shows a simple example of a video on demand (VoD) or video broadcasting configuration in which embodiments of the present invention may be used. While a configuration such as shown in FIG. 1 may be prior art, including an implementation of the method and/or apparatus described herein is not prior art. Note that FIG. 1 is in simplified form, and, for example, only shows transport of streams in one direction, e.g., ultimately towards a subscriber. Control and other information that travels in the opposite direction is not shown in order to not obscure the inventive aspects.

FIG. 1 shows a head end that includes an MPEG source, such as a media server that supplies MPEG streams. The MPEG streams are each assumed to be CBR, and may include null packets that were inserted into a VBR stream to make the stream substantially CBR. The MPEG source is coupled to an MPEG-to-IP gateway 109 that encapsulates the MPEG streams in IP packets, e.g., as IP/UDP/RTP packets. MPEG-to-IP gateway 109 includes an apparatus implements an embodiment of the present invention that includes removing null packets and provides information sufficient to later reconstruct a CBR stream, including later reinserting null packets as necessary to maintain the CBR and correct timing. In one embodiment, the MPEG-to-IP gateway 109 is included in a network switch coupled to an IP packet based network, which may be a private network or internetwork, or may even be a public network or internetwork such as the Internet. In one typical application, network 105 is a fast network such as a gigabit Ethernet network. One or more other servers that provide IP packets that encapsulate MPEG media streams may be coupled to the IP network 105, and one such server is shown as MPEG IP stream server 111.

The IP network 105 is used to transport streams, e.g., MPEG2 single program transport streams to an IP-to-MPEG gateway 113 that in one embodiment includes a network switch. IP-to-MPEG gateway 113 accepts the IP packets, extracts the encapsulated MPEG packets of each of the program streams and reconstructs the MPEG streams for further delivery. In one embodiment, IP-to-MPEG gateway 113 includes an embodiment of the present invention that understands the mechanism that the matching MPEG-to-IP gateway 109 used to provide for correct timing and for the reinsertion of null packets in order to maintain the CBR with the correct timing. The CBR streams may then be transported to their respective destinations. As one example, the IP-to-MPEG gateway 113 is coupled to set of QAM modulators coupled to an HFC network that transports the MPEG streams to end users (also called subscribers). The HFC network is typically complex and includes many distribution points, e.g., to convert from optical to cable form. The end points of the HFC network are subscribers' set top boxes. One such set top box is indicated by reference numeral 115, and includes a decoder that decodes the video stream for playback on an audiovisual terminal, e.g., a TV monitor.

Aspects of the invention are now described for the case of a CBR MPEG media stream that includes a plurality of non-null packets and that may include one or more null packets. While the invention is described in terms of a CBR MPEG stream, the invention is applicable in general to a compressed media data stream that includes non-null compressed media data packets and may include one or more null packets.

Figure 2:
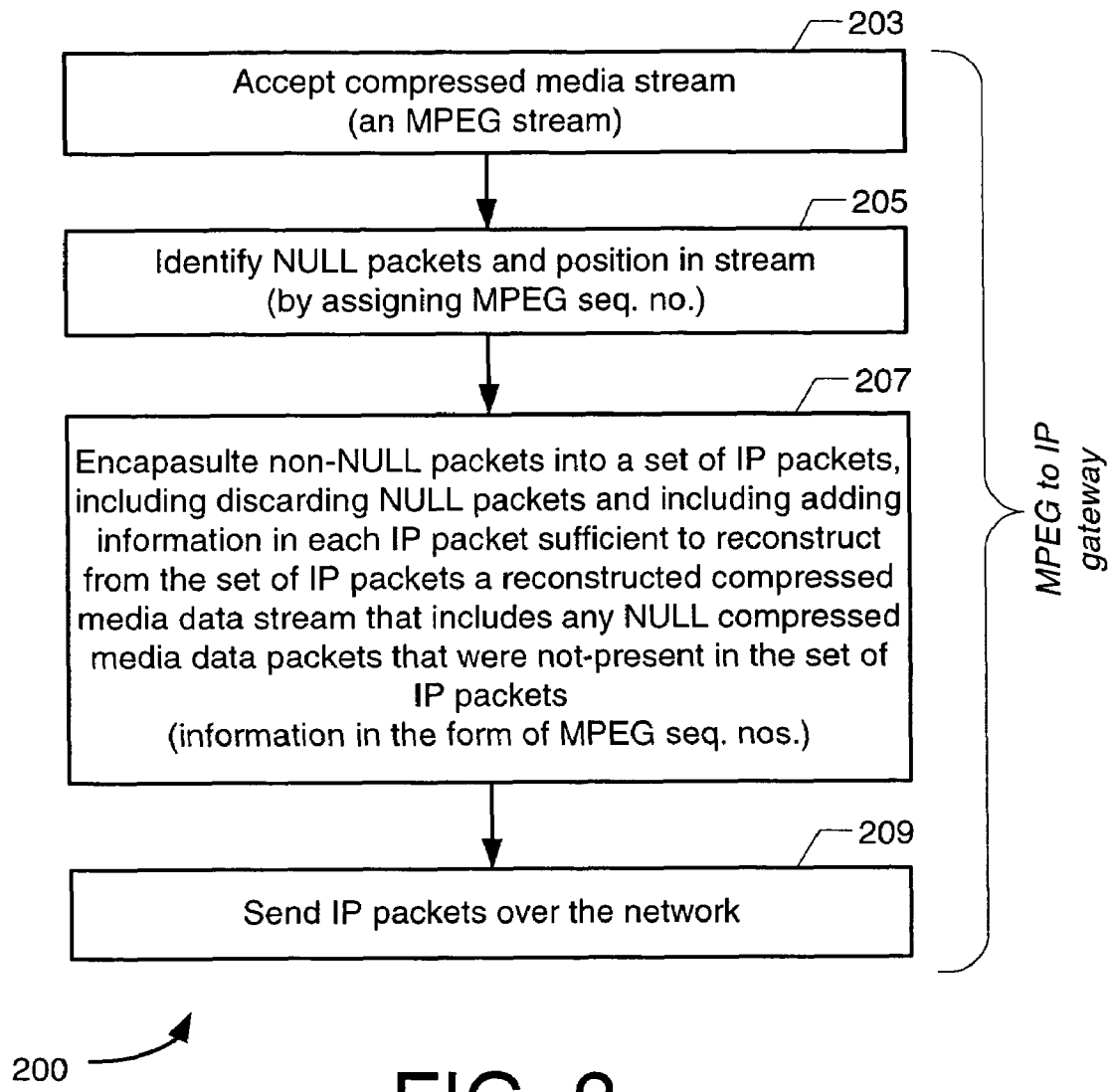
FIG. 2 shows a flow chart of an embodiment of a method of encapsulating MPEG packets of an MPEG stream in a set of IP packets.

FIG. 2 shows a flow chart of an embodiment of a method 200 of encapsulating MPEG packets of an MPEG stream—in general compressed media data packets of a compressed media data stream—in a set of IP packets. The method is typically implemented in an MPEG to IP gateway such as gateway 109. The method includes step 203 of accepting the stream. In one embodiment the stream is a CBR MPEG stream containing a plurality of non-null packets. One or more null packets may be present. The method includes in step 205 identifying any null packets in the accepted stream. The method also includes in step 205 identifying the null packets' relative position in the stream.

The MPEG packets in the CBR MPEG stream including any null packets have a relative order. In one embodiment, according to an aspect of the invention, an identifier is assigned to the MPEG packets of a stream to indicate the order of the MPEG packets in the MPEG stream. This identifier provides for identifying the null packets' relative position. One version uses an identifier called the MPEG sequence number, defined to be a number that increments by 1 for every MPEG transport packet multiplexed in the same MPEG transport stream prior to IP encapsulation. Thus, an MPEG sequence number is assigned to all packets multiplexed in the MPEG transport stream, i.e., both the non-null and the null packets.

The method includes step 207 of encapsulating the non-null compressed media data packets into a set of IP packets. An aspect of the invention includes discarding null packets as part of the encapsulating in the case that the MPEG stream contains one or more null packets.

The encapsulating includes adding information to each IP packet sufficient to reconstruct from the set of IP packets a reconstructed compressed media data stream that may include null packets that were not present in the set of IP packets. The sufficient information provides the number—or information sufficient to determine the number of null packets discarded in the encapsulating step between any two encapsulated packets.

In one embodiment, the adding of the information adds an indication of the relative order in the MPEG stream of each MPEG packet encapsulated in the IP packet. In one embodiment, the added information includes the MPEG sequence numbers of the encapsulated MPEG packets.

Note that RTP also provides a sequence number. The MPEG sequence number defined herein is not, and should not be confused with the RTP sequence number that is assigned in the case IP/UDP/RTP encapsulation is used.

In one embodiment, the encapsulating uses IP/UDP encapsulation. In another, the encapsulating uses IP/UDP/RTP. The IP (IP/UDP or IP/UDP/RTP) packet contains a plurality of MPEG packets. In one embodiment, each IP packet encapsulates the same number, denoted N, of MPEG packets. In the case of MPEG2, the MPEG packets are 188 bytes long. In one embodiment applicable to MPEG2, N is 7 MPEG2 packets.

One embodiment assigns a number of its, say M bits for the MPEG sequence number, so that the MPEG sequence number repeats every $2^M$ packets in the stream. The inventor selected an 8-bit MPEG sequence number on the assumption that in most cases there would be at least one non-null packet every 256 MPEG packets. Without providing a further mechanism, there might be ambiguity in reconstructing the stream when more than 256 null packets in a row exist in a stream. For example, suppose that immediately following MPEG packet sequence number 100 there are 300 null packets with sequence numbers 101, 102, ..., 255, 256, 1, 2, ..., 143, 144. The next (non-null) MPEG packet is thus assigned sequence number 145. Suppose further that all null packets are discarded at the MPEG to IP gateway 109. At the other end, the IP to MPEG gateway 113 would not be able to know if 44 null packets or 256+44=300, or even 300+256=556 null packets were discarded by the MPEG to IP gateway. We call such ambiguity aliasing. It occurs because the MPEG sequence number (m+1) is defined with m=0, 1, ..., 255 being modulo 256, and is analogous to phase wrapping that occurs in phase because phase angle is modulo $2\pi$.

Because more than 256 consecutive null packets is relatively unlikely, the inventor believes using 8-bits for the MPEG sequence number should be sufficient in almost all cases to avoid aliasing. To avoid aliasing for all cases, one aspect of the invention allows only a maximum of 255 (in general, $2^M-1$) consecutive null packets. In the case there are 256 (in general, $2^M-1$) or more consecutive null packets, one of the null packets, e.g., the 256'th null packet is encapsulated as if it was a non-null packet. This avoids aliasing.

Typically, the method also includes step 209 of sending the IP packets encapsulating MPEG packets of the MPEG stream to the appropriate destination.

In the embodiments that use IP/UDP/RTP encapsulation, in order to maintain compatibility with IETF RFC 2250 titled "RTP Payload Format for MPEG1/MPEG2 Video," the inventor selected adding the information in the IP/UDP/RTP packet after the encapsulated MPEG as a trailer so that if an IP to MPEG gateway receives such an IP/UDP/RTP packet but is not aware of the format, the gateway can still treat the IP/UDP/RTP packet as a regular MPEG over IP/UDP/RTP encapsulated packet, thus can at least fully recover the timing information for the first MPEG packet in the IP/UDP/RTP packet and partially recover the timing of all other MPEG packets by using interpolation or predictive methods.

In order for an IP to MPEG gateway to ascertain whether or not an IP packet includes information related to whether or not null packets may have been discarded, the trailer includes an identifying bit pattern. In one embodiment, the format of the trailer is as shown in Table 1:

TABLE 1

| Trailer format | |
|---|---|
| Description | Length |
| Identifying bit pattern | 3 bytes |
| Number of MPEG packets | 1 byte |
| MPEG Sequence number of 1st MPEG packet | 1 byte |
| MPEG Sequence number of 2nd MPEG packet | 1 byte |
| ... | ... |
| MPEG Sequence number of Nth MPEG packet | 1 byte |
| Stuffing bytes to make the size of the trailer to be multiple of 4 bytes | |

While in one embodiment, each IP packet includes the MPEG sequence numbers of the encapsulated packets, In an alternate embodiment, the sufficient information in each IP packet includes the number of null packets discarded in the encapsulating step between any two encapsulated packets. One version of the alternate embodiment provides the number of null packets that were discarded prior to each packet that is encapsulated in the IP packet. Table 2 shown one version of such a trailer for the alternate embodiment.

TABLE 2

| Trailer format (alternate) | |
|---|---|
| Description | Length |
| Identifying bit pattern | 3 bytes |
| Number of MPEG packets | 1 byte |
| Number of null packets discarded before 1st MPEG packet | 1 byte |
| Number of null packets discarded before 2nd MPEG packet | 1 byte |
| ... | ... |
| Number of null packets discarded before Nth MPEG packet | 1 byte |
| Stuffing bytes to make the size of the trailer to be multiple of 4 bytes | |

Figure 3:
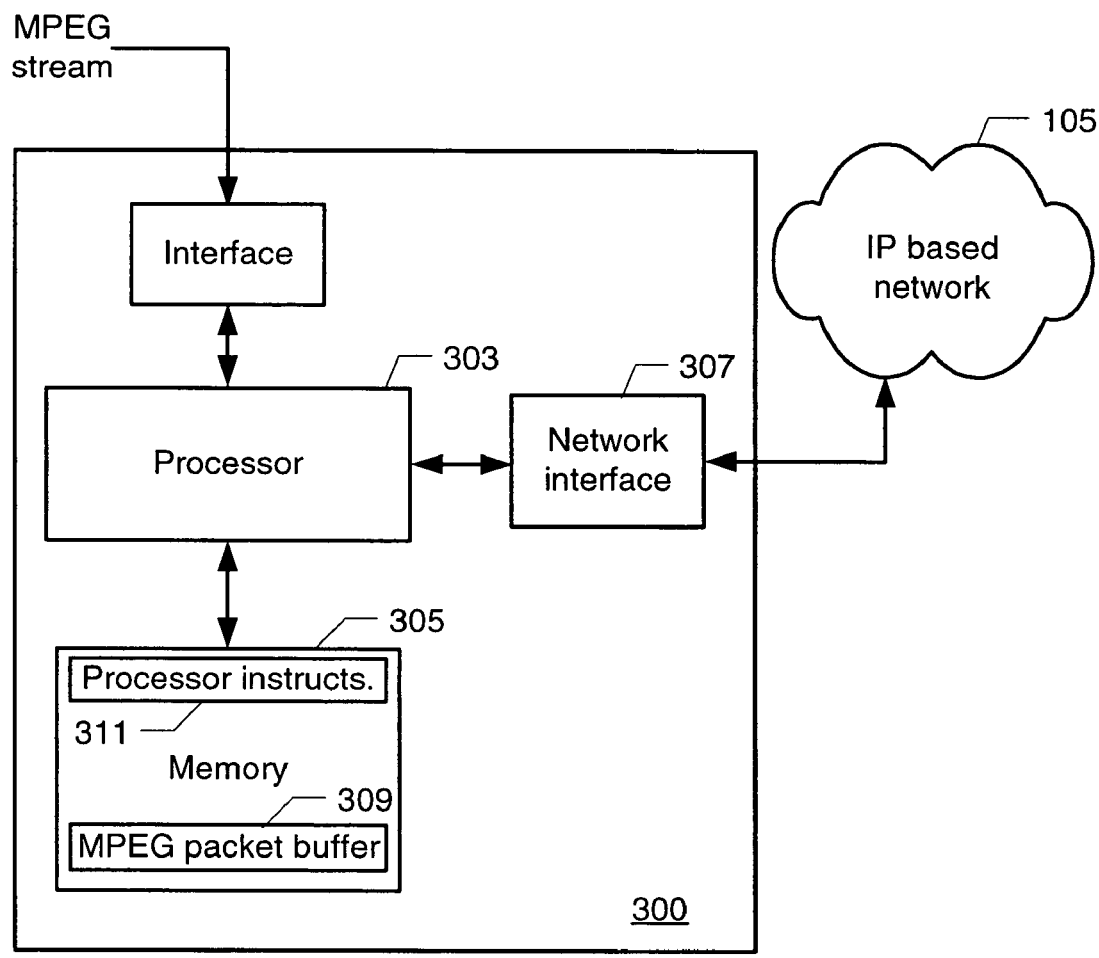
FIG. 3 shows a simplified block diagram of one embodiment of an apparatus that implements a method of encapsulating compressed media data packets of a media stream in a set of IP packets.

FIG. 3 shows a simplified block diagram of one embodiment 300 of an apparatus to encapsulate MPEG packets of an MPEG stream in a set of IP packets, including discarding null packets present in the MPEG stream. The apparatus 300 typically is part of an MPEG to IP gateway. FIG. 3 leaves out a lot of the detail in order not to obscure the inventive aspects. One embodiment includes a processor 303 coupled to a source of the MPEG stream, e.g., via an interface. The MPEG stream is a CBR stream that may contain one or more null MPEG packets. The apparatus includes a memory 309 coupled to the processor to store a subset of the MPEG stream. In one embodiment, the memory 309 is a hardware buffer, and in another, it is part of main memory 305 coupled to the processor 303. The memory 305 includes a set 311 of one or more computer readable code segments that instruct the processor to load the memory buffer 309 with a subset of the MPEG stream and identify any null packets and the null packets' relative position in the stream. In one version, each MPEG packet in the stream is assigned an 8-bit MPEG sequence number that repeats every 256 packets.

The instructions in set 311 also instruct the processor 303 to form an IP packet, including encapsulating non-null MPEG packets from the memory buffer 309 into an IP packet until the IP packet encapsulates a number N of compressed media data packets. The processor re-loads the memory with the next subset of the MPEG stream as necessary. Thus, a set of IP packets is formed encapsulating the non-null MPEG packets of the MPEG stream. As described above, the forming of each IP packet includes discarding at least some of the null packets in the case that the compressed media data stream contains one or more null packets. Furthermore, the forming of each IP packet adds information to each IP packet sufficient to reconstruct from the set of IP packets a reconstructed MPEG stream that includes null packets that were not present in the set of IP packets. In one embodiment, the information is added as a trailer that includes an identifying bit pattern.

Figure 4:
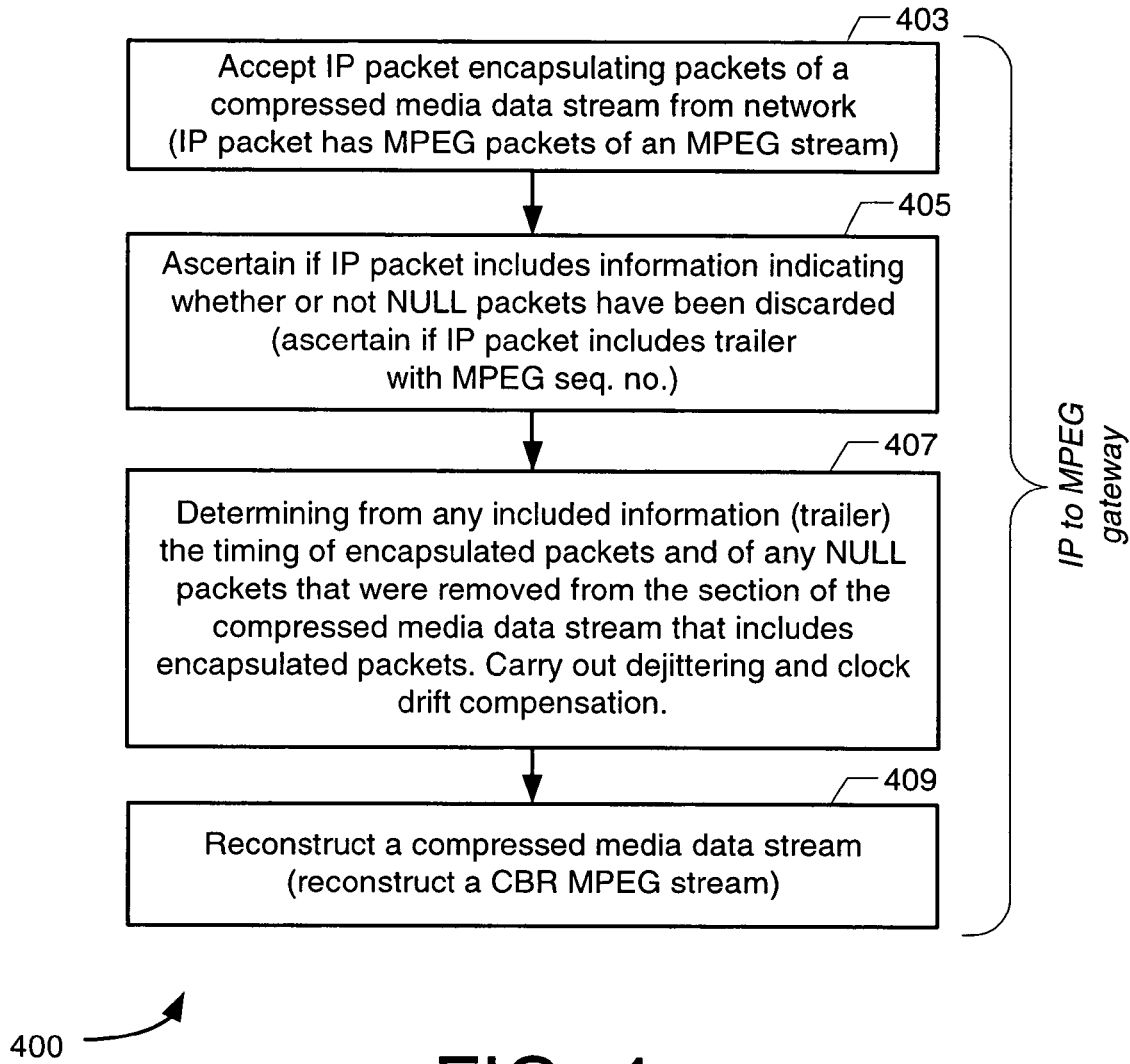
FIG. 4 shows a flow chart of an embodiment of a method of determining the timing of compressed media data packets encapsulated in a set of IP packets. The encapsulated packets may have been encapsulated using the method shown in the flowchart of FIG. 2.

Another aspect of the invention is determining the timing of encapsulated MPEG packets, e.g., in order to reconstruct the CBR MPEG stream from a set of IP packets containing non-null MPEG packets that are from a CBR MPEG stream that contained some null packets. The null packets may have been discarded in the IP encapsulation using the method described herein. FIG. 4 shows a flowchart of one embodiment 400 of a method that includes step 403 of accepting an IP packet encapsulating a subset of MPEG packets—in general compressed media data packets—of an MPEG stream that includes a set MPEG packets—in general, of a compressed media data stream that includes a set of compressed media data packets.

The method includes, in step 405, ascertaining if the IP packet includes information indicating whether or not null packets have been removed from the compressed media data stream.

In one embodiment, the indicating information is in the form of a trailer that includes an identifying bit pattern, e.g., as described above in Table 1 (or Table 2 according to an alternate embodiment). The included indicating information is sufficient to reconstruct from the set of all the IP packets that encapsulate at least the non-null MPEG packets of the MPEG stream a reconstructed CBR MPEG stream that includes null packets not present in the set of IP packets.

In the case that indicating information is included, e.g., the identifying bit pattern is found, step 407 determines from the included indicating information the timing of the encapsulated subset of MPEG packets and of any null packets that were removed from the section of the MPEG stream that includes the encapsulated subset of packets.

Because the delay of IP packets traversing the IP network from source to destination is typically not constant, jitter will typically be introduced. To ensure correct decoding, any MPEG stream reconstructed from the set of IP packets should have delivery scheduled at a time having a constant delay to the timestamp tagged at media stream source, e.g., at the original encoder or server. Otherwise, after some time, the smooth and continuous playback on the user side will break, e.g., because of buffer underflow or overflow at the user's decoder.

The IP to MPEG gateway includes a local clock. Without some synchronization, the local clock will not be synchronized with whatever clock was used for timestamping the MPEG stream at the media stream source, e.g., at the original encoder or server.

In one embodiment, the determining of the timing (step 407) includes dejittering and clock drift compensation. The timing determining is described in more detail below.

One embodiment further includes step 409 of reconstructing a reconstructed CBR MPEG stream by adding null packets as required to form an MPEG stream that is CBR from the encapsulated MPEG packets.

One version uses IP/UDP encapsulation. In such a version, the dejittering and clock drift compensation uses a local clock and clock information included in at least one of the encapsulated MPEG packets. In the case of an MPEG2 stream, the stream includes PCR packets that include such clock information, and the dejittering and clock drift compensation uses the local clock and clock information included in at least PCR packets.

Another version uses IP/UDP/RTP encapsulation. In such a version, the dejittering and clock drift compensation uses a local clock and an RTP timestamp included in the IP packet.

The timing determining is now described in more detail. IP/UDP/RTP encapsulation is assumed. The method is assumed to operate in the IP to MPEG gateway 113 that includes a local clock. When an IP/UDP/RTP packet is received, the arrival time is stamped locally using the local clock. The RTP timestamp incorporated inside the IP/UDP/RTP packet is used to carry out dejittering and clock drifting compensation by using a tracking method to compensate for drift between the local clock and the sending-side (source) clock, and to remove jitter introduced by the IP network. Techniques are known for carrying out such dejittering and clock drifting compensation. Such techniques typically build a phased locked loop and use the RTP timestamp (or the PCR timestamp) for synchronizing the clock. See for example, the following articles that mostly describe techniques in the context of transporting MPEG over ATM networks, but include techniques applicable to dejittering compressed media data streams in general, so can be applied in the methods described herein using either the RTP or PCR timestamp, or both:

G. F. Andreotti, G. Michieletto, L. Mori, and A. Profumo, "Clock recovery and reconstruction of PAL pictures for MPEG coded streams transported over ATM networks," IEEE Trans. Circuits Syst. Video Technol., vol. 5, pp. 508-514, December 1995.

C. Tryfonas, "Video Transport over Packet-Switched Networks," Ph.D. thesis, University of California at Santa Cruz, 1999.

C. Tryfonas, "MPEG-2 transport over ATM networks," Master's thesis, University of California at Santa Cruz, September 1996.

C. Tryfonas and A. Varma, "Timestamping schemes for MPEG-2 systems layer and their effect on receiver clock recovery," IEEE Transactions on Multimedia, pages 251-263, September 1999.

C. Tryfonas and A. Varma, "Effect of input traffic correlation on clock recovery in MPEG-2 systems layer," Technical Report UCSC-CRL-99-6, University of California at Santa Cruz, Dept. of Computer Engineering, March 1999.

C. Tryfonas and A. Varma, "A restamping approach to clock recovery in MPEG-2 systems layer," Technical Report UCSC-CRL-98-4, University of California at Santa Cruz, Dept. of Computer Engineering, May 1998.

R. Noro and J. P. Hubaux, "Clock Synchronization of MPEG-2 Services over Packet Networks," Technical Report SSC/1998/015, EPFL-SSC, Laboratory for computer Communications and Applications, Swiss Federal Institute of Technology—Lausanne (EPFL), Switzerland, 1998.

One embodiment uses a method modified from that described in U.S. patent application Ser. No. 10/096,191 to inventors Gou et al., filed Mar. 11, 2002, and titled REMOVING JITTER BY ADAPTIVE SLOPE TRACKING, incorporated herein by reference. The invention however does not require using any particular method.

Using the RTP clock and the dejittering/clock drift compensation generates the timing information for the first MPEG packet encapsulated in the IP/UDP/RTP packet.

Figure 5:
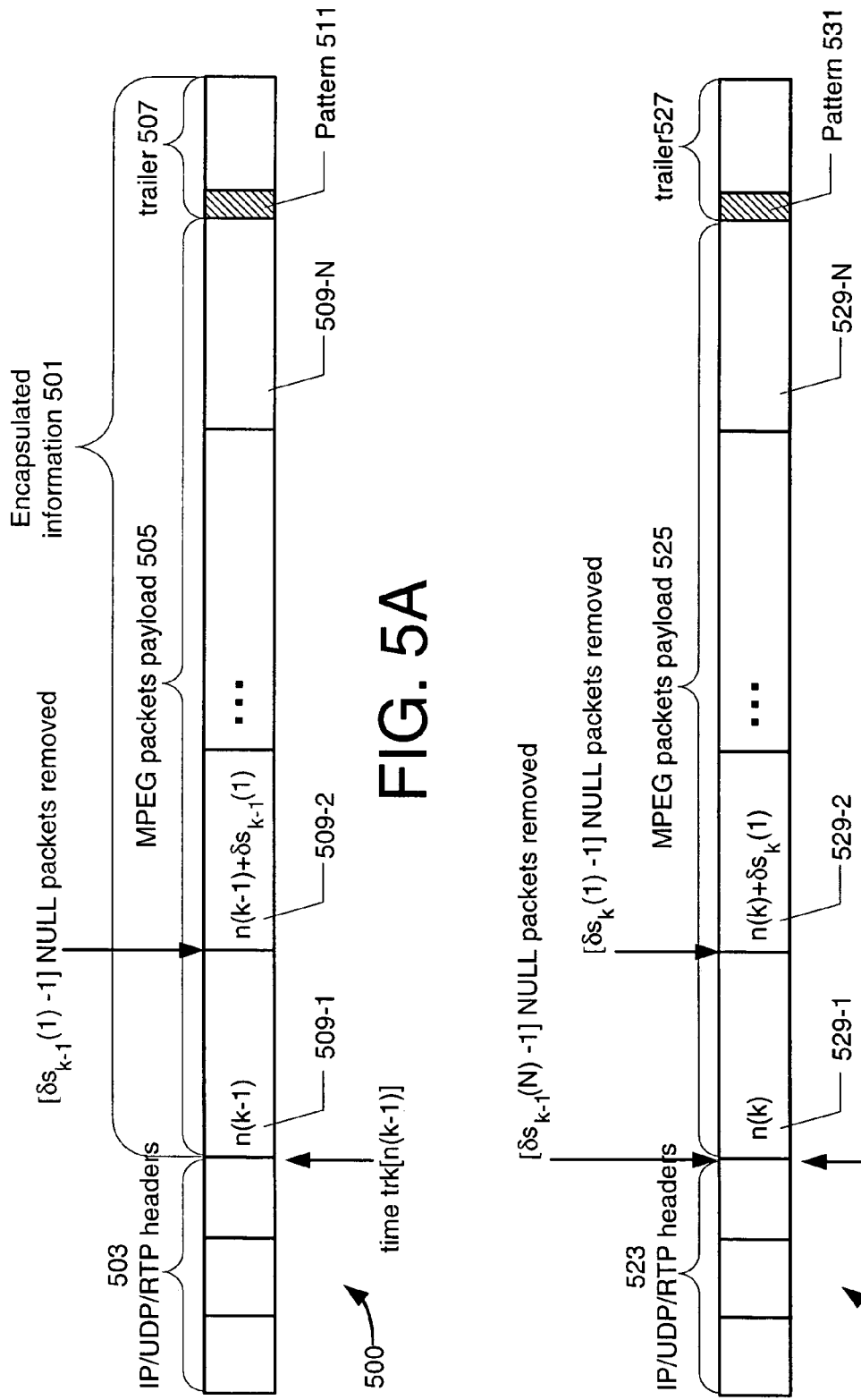
FIGS. 5A and 5B each shown an IP/UDP/RTP packet encapsulating compressed media stream packets. The encapsulated packets may have been encapsulated using the method shown in the flowchart of FIG. 2.

FIG. 5A shows in simplified form the (k−1)'th IP/UDP/RTP packet 500 having headers 503 and encapsulating a payload 501 that includes N MPEG packets (505) having reference numerals 509-1, 509-2, ..., 509-N, respectively, and a trailer 507. The trailer 507 includes an identifying bit pattern 511 and information about the MPEG sequence numbers of the encapsulated MPEG packets. Let n(k−1) be the MPEG sequence number of the first encapsulated MPEG packet 509-1. Denote by $\delta s_{k-1}(j)$, j=1, 2 ..., N−1, the difference in MPEG sequence number between the j'th MPEG packet the next encapsulated MPEG packet. Let $\delta s_{k-1}(N)$ be the difference in MPEG sequence number between the last (N'th) MPEG and the first MPEG packet in the next, i.e., the k'th IP/UDP/RTP packet. Thus, $\delta s_{k-1})-1$ is the number of null packets that have been discarded immediately following the j'th encapsulated MPEG packet, j=1, ..., N. Denote by trk[n(k−1)] the tracked timing of the first MPEG packet encapsulated in the (k−1)'th IP/UDP/TRP packet.

FIG. 5B similarly shows in simplified form the k'th IP/UDP/RTP packet 520 having headers 523 and encapsulating a payload that includes N MPEG packets (525) having reference numerals 529-1, 529-2, ..., 529-N, respectively, and a trailer 527. The trailer 527 includes an identifying bit pattern 531 and information about the MPEG sequence numbers of the N encapsulated MPEG packets. Let n(k) be the MPEG sequence number of the first encapsulated MPEG packet 529-1. Denote by $\delta s_k(j)$, j=1, 2, ..., N−1, the difference in MPEG sequence number between the j'th MPEG packet the next encapsulated MPEG packet in IP packet 520. Let $\delta s_{k-1}(N)$ be the difference in MPEG sequence number between the last (N'th) MPEG and the first MPEG packet in the next, i.e., the (k+1)'th IP/UDP/RTP packet. Thus, $\delta s_k(j)-1$ is the number of null packets that have been discarded immediately following the j'th encapsulated MPEG packet, j=, ..., N. $\delta s_{k-1}(N)-1$ is the number of null packets that were discarded immediately prior to the first MPEG packet in IP/UDP/RTP packet 520. Denote by trk[n(k)] the tracked timing of the first MPEG packet encapsulated in IP/UDP/RTP packet 520.

The N packets of the (k−1)'th packet have MPEG sequence numbers:

$n(k-1)$ $n(k-1)+\delta s_{k-1}(1)$ $n(k-1)+\delta s_{k-1}(1)+\delta s_{k-1}(2)$

...

$n(k-1)+\delta s_{k-1}(1)+\delta s_{k-1}(2)+\ldots+\delta s_{k-1}(N-1)$, and the N packets of the k'th packet have MPEG sequence numbers:

$n(k)$ $n(k)+\delta s_k(1)$ $n(k)+\delta s_k(1)+\delta s_k(2)$

...

$n(k)+\delta s_k(1)+\delta s_k(2)+\ldots+\delta s_k(N-1)$

Denote by $S_k$ the total number of packets of the section of the original MPEG stream that includes all the encapsulated MPEG packets in the k'th IP/UDP/RTP packet, including the null packets that were dropped immediately after each of the encapsulated MPEG packets. Then, for the (k−1)'th packet $S_{k-1} = \delta s_{k-1}(1)+\delta s_{k-1}(2)+\ldots+\delta s_{k-1}(N-1)+\delta s_{k-1}(N)$ total packets.

In step 407, calculating the values of $\delta s_{k-1}(j)$, j=1, ..., N involves subtracting the sequence numbers of every two consecutive MPEG packet encapsulated in a packet interpreting the result as unsigned number.

In one embodiment, the inter MPEG-packet timing difference can be recovered by interpolation. Let $\delta t_{k-1}$ denote the timing difference between each consecutive MPEG sequence number for the MPEG packets encapsulated in the (k−1)'th IP/UDP/RTP packet. Then $\delta t_{k-1} = (trk[n(k)] - trk[n(k-1)])/S_k$.

Thus, the timing of the N MPEG packets encapsulated in the (k−1)'th IP/UDP/RTP packet is determined as $trk[n(k-1)]$ $trk[n(k-1)]+(\delta s_{k-1}(1))*\delta t_{k-1}$ $trk[n(k-1)]+(\delta s_{k-1}(1)+\delta s_{k-1}(2))*\delta t_{k-1}$, $trk[n(k-1)]+(\delta s_{k-1}(1)+\delta s_{k-1}(2)+\ldots+\delta s\_di\ k-1(N-1))*\delta t_{k-1}$, where * is multiplication.

In the version applicable to IP/UDP encapsulation, the tracked time is not of the first encapsulated MPEG packet, but rather of (at least) the first MPEG packet containing clock information, e.g., the first PCR MPEG packet. The above described calculations may be modified in a straightforward manner to determine the correct timing for the encapsulated non-PCR MPEG packets that occur prior to the PCR packet and for the non-PCR MPEG packets between the PCR packets.

In an alternate IP/UDP/RTP embodiment, both the RTP clock and the clock information in encapsulated PCR packets is used.

In yet another embodiment, extrapolation rather than interpolation is used for the tracking. In the extrapolation method, there is no need to wait for the k'th IP/UDP/RTP packet to determine the timing of the MPEG packets encapsulated in the (k−1)'th IP packet. The tracked timing (k−1)'th and (k−2)'th is used to predict the timing between each consecutive MPEG sequence number of the MPEG packets in the (k−1)'th IP/UDP/TRP packet. The above described calculations may be modified in a straightforward manner to determine the correct timing for the encapsulated MPEG packets for the case of using extrapolation with IP/UDP/RTP encapsulation. Similarly, one in the art can modify the above formulae to determine interpacket timing for IP/UDP encapsulation with an extrapolation method.

Figure 6:
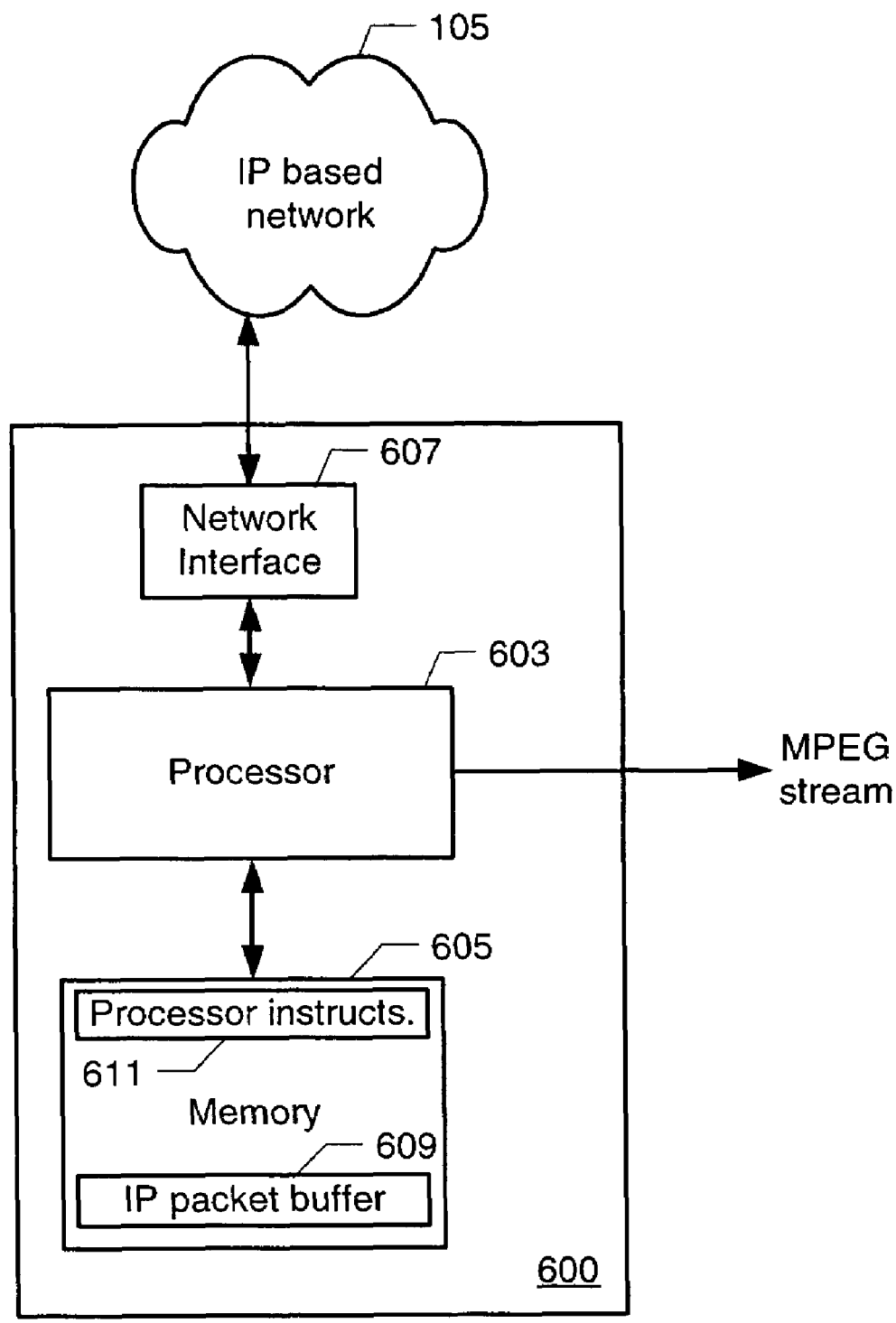
FIG. 6 shows a simplified block diagram of one embodiment of an apparatus that implements a method of determining the timing of compressed media data packets encapsulated in a set of IP packets. The encapsulated packets may have been encapsulated using the method shown in the flowchart of FIG. 2.

FIG. 6 shows a simplified block diagram of one embodiment 600 of an apparatus that implements the method described above of determining the timing of the encapsulating MPEG packets, e.g., in order to reconstruct the CBR MPEG stream from the set of IP packets containing non-null MPEG packets that are from a CBR MPEG stream that contained some null packets that were discarded in the IP encapsulation using the method described herein. The apparatus 600 typically is part of an IP to MPEG gateway such as gateway 113. FIG. 6 leaves out a lot of the detail in order not to obscure the inventive aspects. One embodiment includes a processor 603 coupled to network interface 607 that is coupled to an IP packet network such as network 115. The network interface is capable of accepting IP packets from the network. By accepting an IP packet is meant accepting IP packets that are addressed to the apparatus. Not described is the PHY, MAC, IP etc. layer operations that are involved in so accepting the IP packets.

The apparatus includes a memory 609 coupled to the processor to store at least one IP packet that encapsulated MPEG packets from a section of the MPEG stream. In one embodiment, the memory 609 is a hardware buffer, and in another, it is part of main memory 605 coupled to the processor 603. The memory 605 includes a set 611 of one or more computer readable code segments that instruct the processor to load the memory buffer 609 with at least the payload of an IP/UDP/RTP packet or IP/UDP in a version that handles encapsulated MPEG packets using IP/UDP encapsulation.

The set of instructions 611 include instructions for the processor to ascertain if the IP packet in the memory buffer 609 includes information indicating whether or not null packets have been removed from the MPEG stream. In one embodiment, the indicating information is in the form of a trailer that includes an identifying bit pattern as described above in Table 1 (or Table 2 according to an alternate embodiment). The included indicating information is sufficient to reconstruct from the set of all the IP packets that encapsulate at least the non-null MPEG packets of the MPEG stream a reconstructed CBR MPEG stream that includes null packets not present in the set of IP packets.

In the case that indicating information is included, e.g., the identifying bit pattern is found, the instructions instruct the processor to determine from the included indicating information the timing of the encapsulated subset of MPEG packets and of null packets that were removed from the section of the MPEG stream that includes the encapsulated subset of packets. The instructions include instructions to load the next IP packet encapsulating another subset of the compressed media data packets of the compressed media stream into the memory buffer 611.

Thus have been described methods and apparatuses that provide for saving IP bandwidth by transporting mainly the information bearing compressed media stream packets on the IP networks, with (most of) the null packets that may have been added to the stream being discarded prior to the transport over the IP network.

Furthermore, by including the information related to the dropped null packets at the end of the encapsulation, compatibility is maintained with methods and apparatuses that are not aware of the inventive aspects described herein.

Note that while FIGS. 3 and 6 each shows one processor, in general, the MPEG to IP gateway or the IP to MPEG gateway may include a processing system that includes more than one processor. In such a case, those skilled in the art will understand by "the processor" any of the included processors. Furthermore, each task or step may be performed by different one or ones of the processors.

One embodiment of each of the methods described herein is in the form of a computer program that executes on a processing system, e.g., a one or more processors that are part of an IP to MPEG gateway or part of an MPEG to IP gateway, as appropriate. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of MPEG2, the invention is not limited to such contexts and may be utilized in various other applications and systems, for example in a system that uses MPEG1, MPEG4, or other compressed media data streams. Furthermore, the invention is not limited to any one type of network architecture and method of encapsulation, and thus may be utilized in conjunction with one or a combination of other network architectures/protocols.

While in some embodiments, each IP packet encapsulates the same number of MPEG packets, alternate embodiments can vary the number of MPEG packets encapsulated in each IP packet.

Note that one embodiment of the timing reconstruction method (and apparatus therefor) described above includes loading an IP packet encapsulating a subset of the compressed media data packets of a compressed media stream and loading the next IP packet encapsulating another subset of the compressed media data packets of the compressed media stream. "Loading an IP packet," "loading the next IP packet," and similar statements in the description and claims is meant loading at least the payload or payloads that contain the MPEG packets of at least one IP packet. This does not necessarily imply that the memory can only hold one IP packet's payload at a time, or that the reloading occurs one IP packet's worth of data at a time, or that the reloading occurs at the end of processing each IP packet's worth of data. Similarly, the loading and reloading of the subset of MPEG packets is not restricted to any number being loaded at a time.

Note that by a CBR MPEG stream is meant a stream that is exactly substantially or close to, i.e., substantially CBR. One such substantially CBR stream is a variable bit rate (VBR) stream that has been made substantially CBR by adding null packets.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

I claim:

1. A method comprising:
   accepting a compressed media data stream containing a plurality of non-null packets of compressed media data and possibly one or more null packets;
   identifying any null packets in the accepted stream and the null packets' relative position in the stream;
   forming a set of IP packets including, discarding at least one of the null packets in the case that the compressed media data stream contains one or more null packets, and encapsulating the non-null compressed media data packets into the set of IP packets; and
   adding information to the set of IP packets, the information sufficient to enable a recipient of the set of IP packets to reconstruct from the set of IP packets a reconstructed compressed media data stream that may include null packets,
   wherein the encapsulating includes discarding at least some of the null packets in the case that the compressed media data stream contains one or more null packets.

2. A method as recited in claim 1, wherein the compressed media data stream is a CBR MPEG stream that includes MPEG packets.

3. A method as recited in claim 2, wherein the MPEG packets in the CBR MPEG stream including any null packets have a relative order, and wherein the adding of the information adds an indication of the relative order in the MPEG stream of each MPEG packet encapsulated in the IP packet.

4. A method as recited in claim 3, wherein the indication of the relative order is in the form of an M-bit number indicating an MPEG sequence number that repeats every $2^M$ MPEG packets in the stream, and wherein in the case that there are more than $2^M-1$ consecutive null packets in the stream, at least one of the consecutive null packets is encapsulated as if it was a non-null MPEG packet.

5. A method as recited in claim 4, wherein M is 8.

6. A method as recited in claim 2, wherein the CBR MPEG stream is an MPEG2 CBR stream of a single program.

7. A method as recited in claim 1, wherein the encapsulating uses IP/UDP encapsulation.

8. A method as recited in claim 1, wherein the encapsulating uses IP/UDP/RTP encapsulation.

9. A method as recited in claim 1, wherein the adding of information to each IP packet adds a trailer including an identifying bit pattern.

10. A method comprising:
    accepting an IP packet encapsulating a subset of compressed media data packets of a compressed media data stream that includes a set of compressed media data packets;
    ascertaining if the IP packet includes information indicating whether or not null packets have been discarded from the compressed media data stream;
    in the case that indicating information is included, determining from the included indicating information the timing of the encapsulated subset of packets and of null packets that were discarded from the section of the compressed media data stream that includes the encapsulated subset of packets,
    wherein the included indicating information is sufficient to reconstruct from the set of all the IP packets that encapsulate packets of the compressed media data stream a reconstructed compressed media data stream that includes null packets that were not present in the set of IP packets.

11. A method as recited in claim 10, wherein the compressed media data stream is a CBR MPEG stream that includes MPEG packets.

12. A method as recited in claim 11, wherein the MPEG packets in the CBR MPEG stream including any null packets have a relative order, and wherein the indicating information is an indication of the relative order in the MPEG stream of each MPEG packet encapsulated in the IP packet.

13. A method as recited in claim 12, wherein the indication of the relative order is in the form of an M-bit number indicating an MPEG sequence number that repeats every $2^M$ MPEG packets in the stream.

14. A method as recited in claim 13, wherein M is 8.

15. A method as recited in claim 11, further comprising:
    reconstructing a reconstructed CBR MPEG stream by adding null packets as required to form an MPEG stream that is CBR from the encapsulated MPEG packets.

16. A method as recited in claim 11, wherein CBR MPEG stream is an MPEG2 CBR stream of a single program.

17. A method as recited in claim 10, wherein the IP packet encapsulating the subset of packets uses IP/UDP encapsulation.

18. A method as recited in claim 17, wherein the determining of the timing includes dejittering and clock drift compensation using a local clock and clock information included in at least one of the encapsulated compressed media data packets.

19. A method as recited in claim 10, wherein the IP packet encapsulating the subset of packets uses IP/UDP/RTP encapsulation.

20. A method as recited in claim 19, wherein the determining of the timing includes dejittering and clock drift compensation using a local clock and an RTP timestamp included in the IP packet.

21. A method as recited in claim 10, wherein the ascertaining if indicating information is included includes ascertaining if an identifying bit pattern is included.

22. A method as recited in claim 21, wherein the indicating information if included in the IP packet is in a trailer in the IP packet, the trailer including the identifying bit pattern.

23. An apparatus comprising:
a processor coupled to a source of a compressed media data stream containing a plurality of non-null packets of compressed media data and possibly one or more null packets; and
a memory coupled to the processor to store a subset of a compressed media data stream,
the processor to
load the memory with a subset of the compressed media data stream,
identify any null packets in the memory and information on the null packets' relative position in the stream;
form an IP packet, including encapsulating non-null compressed media data packets from the memory into an IP packet until the IP packet encapsulates a number of compressed media data packets; and
re-load the memory with the next subset of the compressed media data stream,
such that a set of IP packets is formed encapsulating the non-null compressed media data packets,
wherein the forming of each IP packet adds information to each IP packet, the information sufficient to reconstruct from the set of IP packets a reconstructed compressed media data stream that includes null packets that were not present in the set of IP packets, and wherein the forming of each IP packet includes discarding at least some of the null packets in the case that the compressed media data stream contains one or more null packets.

24. An apparatus as recited in claim 23, wherein the compressed media data stream is a CBR MPEG stream that includes MEPG packets.

25. An apparatus as recited in claim 24, further comprising:
an interface, coupled to the processor and to a network capable of transporting IP packets.

26. An apparatus as recited in claim 24, wherein the MPEG packets in the CBR MPEG stream including any null packets have a relative order, and wherein the processor's adding of the information adds an indication of the relative order in the MPEG stream of each MPEG packet encapsulated in the IP packet.

27. An apparatus as recited in claim 26, wherein the indication of the relative order is in the form of an M-bit number indicating an MPEG sequence number that repeats every $2^M$ MPEG packets in the stream, and wherein in the case that there are more than $2^M-1$ consecutive null packets in the stream, at least one of the consecutive null packets is encapsulated as if it was a non-null MPEG packet.

28. An apparatus as recited in claim 23, wherein the processor's adding of information to each IP packet adds a trailer including an identifying bit pattern.

29. An apparatus comprising:
a processor;
a memory coupled to the processor; and
a network interface coupled to the processor and to a network capable of accepting IP packets from the network;
the memory to store an IP packet encapsulating a subset of compressed media data packets of a compressed media data stream that includes a set of compressed media data packets, the processor to
load an IP packet encapsulating a subset of the compressed media data packets of a compressed media stream,
ascertain if the IP packet in the memory includes information indicating whether or not null packets have been discarded from the compressed media data stream,
in the case that indicating information is included, determine from the included indicating information the timing of the encapsulated subset of packets and of null packets that were discarded from the section of the compressed media data stream that includes the encapsulated subset of packets, and
load the next IP packet encapsulating another subset of the compressed media data packets of the compressed media stream,
wherein the included indicating information is sufficient to reconstruct from the set of all the IP packets that encapsulate packets of the compressed media data stream a reconstructed compressed media data stream that includes null packets that were not present in the set of IP packets.

30. An apparatus as recited in claim 29, wherein the compressed media data stream is a CBR MPEG stream that includes MPEG packets.

31. An apparatus as recited in claim 30, wherein the MPEG packets in the CBR MPEG stream including any null packets have a relative order, and wherein the indicating information is an indication of the relative order in the MPEG stream of each MPEG packet encapsulated in the IP packet.

32. An apparatus as recited in claim 30, wherein the processor is further to:
reconstruct a reconstructed CBR MPEG stream by adding null packets as required to form an MPEG stream that is CBR from the encapsulated MPEG packets.

33. An apparatus as recited in claim 29, further comprising:
a local clock,
wherein the IP packet encapsulating the subset of packets uses IP/UDP encapsulation, and
wherein the processor's determining of the timing includes dejittering and clock drift compensation using the local clock and clock information included in at least one of the encapsulated compressed media data packets.

34. An apparatus as recited in claim 29, further comprising:
a local clock,
wherein the IP packet encapsulating the subset of packets uses IP/UDP/RTP encapsulation, and
wherein the processor's determining of the timing includes dejittering and clock drift compensation using the local clock and an RTP timestamp included in the IP packet.

35. An apparatus as recited in claim 29, wherein the processor's ascertaining if indicating information is included includes ascertaining if an identifying bit pattern is included.

36. An apparatus comprising:
  means for accepting a compressed media data stream containing a plurality of non-null packets of compressed media data and possibly one or more null packets;
  means for identifying any null packets in the accepted stream and information on the null packets' relative position in the stream;
  means for forming a set of IP packets including means for encapsulating the non-null compressed media data packets into the set of IP packets; and
  means for adding information to each IP packet, the information sufficient to reconstruct from the set of IP packets a reconstructed compressed media data stream that includes null packets that were not present in the set of IP packets,
wherein the forming by the means for forming includes discarding at least one of the null packets in the case that the compressed media data stream contains one or more null packets.

37. An apparatus as recited in claim 36, wherein the compressed media data stream is a CBR MPEG stream that includes MPEG packets.

38. An apparatus as recited in claim 37, wherein the MPEG packets in the CBR MPEG stream including any null packets have a relative order, and wherein the adding of the information by the means for adding includes adding an indication of the relative order in the MPEG stream of each MPEG packet encapsulated in the IP packet.

39. An apparatus comprising:
  means for accepting an IP packet encapsulating a subset of compressed media data packets of a compressed media data stream that includes a set of compressed media data packets;
  means for ascertaining if the IP packet includes information indicating whether or not null packets have been discarded from the compressed media data stream;
  means for determining timing, the timing determining means determining, in the case that indicating information is included, the timing of the encapsulated subset of packets and of null packets that were discarded from the section of the compressed media data stream that includes the encapsulated subset of packets, the timing determining using the included indicating information,
wherein the included indicating information is sufficient to reconstruct from the set of all the IP packets that encapsulate packets of the compressed media data stream a reconstructed compressed media data stream that includes null packets that were not present in the set of IP packets.

40. An apparatus as recited in claim 39, wherein the compressed media data stream is a CBR MPEG stream that includes MPEG packets.

41. An apparatus as recited in claim 40, wherein the MPEG packets in the CBR MPEG stream including any null packets have a relative order, and wherein the indicating information is an indication of the relative order in the MPEG stream of each MPEG packet encapsulated in the IP packet.

42. An apparatus as recited in claim 39, wherein the IP packet encapsulating the subset of packets uses IP/UDP encapsulation, and wherein the means for determining of the timing carries out dejittering and clock drift compensation using a local clock and clock information included in at least one of the encapsulated compressed media data packets.

43. An apparatus as recited in claim 39, wherein the IP packet encapsulating the subset of packets uses IP/UDP/RTP encapsulation, and wherein the means for determining of the timing carries out dejittering and clock drift compensation using a local clock and an RTP timestamp included in the IP packet.

44. A computer readable medium encoded with computer executable instructions when executed by one or more processors of a processing system implements a method, said method comprising:
  accepting a compressed media data stream containing a plurality of non-null packets of compressed media data and possibly one or more null packets;
  identifying any null packets in the accepted stream and information on the null packets' relative position in the stream;
  forming a set of IP packets including encapsulating the non-null compressed media data packets into the set of IP packets; and
  adding information to each IP packet, the information sufficient to reconstruct from the set of IP packets a reconstructed compressed media data stream that includes null packets that were not present in the set of IP packets,
wherein the forming includes discarding at least some of the null packets in the case that the compressed media data stream contains one or more null packets.

45. A computer readable medium as recited in claim 44, wherein the compressed media data stream is a CBR MPEG stream that includes MPEG packets.

46. A computer readable medium as recited in claim 45, wherein the MPEG packets in the CBR MPEG stream including any null packets have a relative order, and wherein the adding of the information adds an indication of the relative order in the MPEG stream of each MPEG packet encapsulated in the IP packet.

47. A computer readable medium encoded with computer executable instructions when executed by one or more processors of a processing system implements a method, said method comprising:
  accepting an IP packet encapsulating a subset of compressed media data packets of a compressed media data stream that includes a set of compressed media data packets;
  ascertaining if the IP packet includes information indicating whether or not null packets have been discarded from the compressed media data stream;
  in the case that indicating information is included, determining from the included indicating information the timing of the encapsulated subset of packets and of null packets that were discarded from the section of the compressed media data stream that includes the encapsulated subset of packets,
wherein the included indicating information is sufficient to reconstruct from the set of all the IP packets that encapsulate packets of the compressed media data stream a reconstructed compressed media data stream that includes null packets that were not present in the set of IP packets.

48. A computer readable medium as recited in claim 47, wherein the compressed media data stream is a CBR MPEG stream that includes MPEG packets.

49. A computer readable medium as recited in claim 48, wherein the MPEG packets in the CBR MPEG stream including any null packets have a relative order, and wherein the indicating information is an indication of the relative order in the MPEG stream of each MPEG packet encapsulated in the IP packet.

50. A computer readable medium as recited in claim 47, wherein the determining of the timing includes dejittering and clock drift compensation.

* * * * *

UNITED STATES PATENT AND TRADEMARK OFFICE
CERTIFICATE OF CORRECTION

PATENT NO.       : 7,349,386 B2
APPLICATION NO.  : 10/369033
DATED            : March 25, 2008
INVENTOR(S)      : Gou It is certified that error appears in the above-identified patent and that said Letters Patent is hereby corrected as shown below:

In column 9, line 57, kindly change "j=,...,N." to -- j=1,...N. --

In column 10, lines 39-44, kindly change

"trk[n(k-1)]
trk[n(k-1)]+ ($\delta s_{k-1}(1)$)* $\delta t_{k-1}$
trk[n(k-1)]+ ($\delta s_{k-1}(1)+ \delta s_{k-1}(2)$)* $\delta t_{k-1}$'
trk[n(k-1)]+ ($\delta s_{k-1}(1)+ \delta s_{k-1}(2)+...+\delta s_{k-1}(N-1)$)* $\delta t_{k-1}$,"

to

-- trk[n(k-1)]
trk[n(k-1)]+ ($\delta s_{k-1}(1)$)* $\delta t_{k-1}$
trk[n(k-1)]+ ($\delta s_{k-1}(1)+ \delta s_{k-1}(2)$)* $\delta t_{k-1}$
...

trk[n(k-1)]+ ($\delta s_{k-1}(1)+ \delta s_{k-1}(2)+...+\delta s_{k-1}(N-1)$)* $\delta t_{k-1}$, --

In column 18, lines 6-10, kindly change "A computer readable medium encoded with computer executable instructions when executed by one or more processors of a processing system implements a method, said method comprising:" to -- A computer readable tangible carrier medium carrying one or more computer readable code segments to instruct one or more processors of a processing system to implement a method, the method comprising: --

UNITED STATES PATENT AND TRADEMARK OFFICE
CERTIFICATE OF CORRECTION

PATENT NO. : 7,349,386 B2
APPLICATION NO. : 10/369033
DATED : March 25, 2008
INVENTOR(S) : Gou It is certified that error appears in the above-identified patent and that said Letters Patent is hereby corrected as shown below:

In column 18, lines 40-44, kindly change "A computer readable medium encoded with computer executable instructions when executed by one or more processors of a processing system implements a method, said method comprising:" to -- A computer readable tangible carrier medium carrying one or more computer readable code segments to instruct one or more processors of a processing system to implement a method, the method comprising: --

Signed and Sealed this

Fourteenth Day of October, 2008

JON W. DUDAS
*Director of the United States Patent and Trademark Office*